(12) United States Patent
Clauss et al.

(10) Patent No.: US 8,920,643 B2
(45) Date of Patent: Dec. 30, 2014

(54) APPARATUS FOR PICKING UP PARTICLES FROM THE SURFACE OF A WATER SYSTEM

(75) Inventors: Günther Clauss, Berlin (DE); Florian Sprenger, Berlin (DE)

(73) Assignee: Technische Universität Berlin (DE)

( * ) Notice: Subject to any disclaimer, the term of this patent is extended or adjusted under 35 U.S.C. 154(b) by 572 days.

(21) Appl. No.: 13/263,990

(22) PCT Filed: Apr. 14, 2010

(86) PCT No.: PCT/DE2010/000420
§ 371 (c)(1),
(2), (4) Date: Dec. 5, 2011

(87) PCT Pub. No.: WO2010/118733
PCT Pub. Date: Oct. 21, 2010

(65) Prior Publication Data
US 2012/0067806 A1  Mar. 22, 2012

(30) Foreign Application Priority Data

Apr. 14, 2009 (DE) .......................... 10 2009 016 960

(51) Int. Cl.
*E02B 15/04* (2006.01)
*B63B 35/32* (2006.01)
*C02F 103/00* (2006.01)

(52) U.S. Cl.
CPC ........... *B63B 35/32* (2013.01); *C02F 2103/007* (2013.01); *E02B 15/048* (2013.01); *E02B 15/046* (2013.01); *Y10S 210/923* (2013.01)
USPC .............. 210/170.05; 210/170.11; 210/242.1; 210/242.3; 210/923

(58) Field of Classification Search
CPC ..... E02B 15/046; E02B 15/048; E02B 15/10; B63B 35/32; C02F 2103/007
USPC .............. 210/170.05, 170.09, 170.11, 242.1, 210/242.3, 776, 923
See application file for complete search history.

(56) References Cited

U.S. PATENT DOCUMENTS 3,693,801 A * 9/1972 Pogonowski .............. 210/242.3
3,715,034 A 2/1973 Ivanoff
(Continued)

FOREIGN PATENT DOCUMENTS

DE   2917614   11/1980
DE   10221069   1/2004
(Continued)

OTHER PUBLICATIONS

International Search Report issued Aug. 23, 2010; PCT/DE2010/000420; Int'l File Date: Apr. 14, 2010; Earliest Priority: Apr. 14, 2009.

(Continued)

*Primary Examiner* — Christopher Upton
(74) *Attorney, Agent, or Firm* — Schmeiser, Olsen & Watts, LLP

(57) ABSTRACT

The invention relates to an apparatus for picking up particles from the surface of a water system, in particular particles of dirt, with a float (1), in which a particle separation chamber (8) is formed, into which particle-containing water can flow via an inflow opening (7), and out of which water at least partially freed from the particles can flow via an outflow opening (9), wherein the inflow opening (7) is provided with an inflow flap means and the outflow opening (9) is provided with an outflow flap means for opening and closing of the opening (9).

13 Claims, 4 Drawing Sheets

(56) References Cited

U.S. PATENT DOCUMENTS

Figure 1:
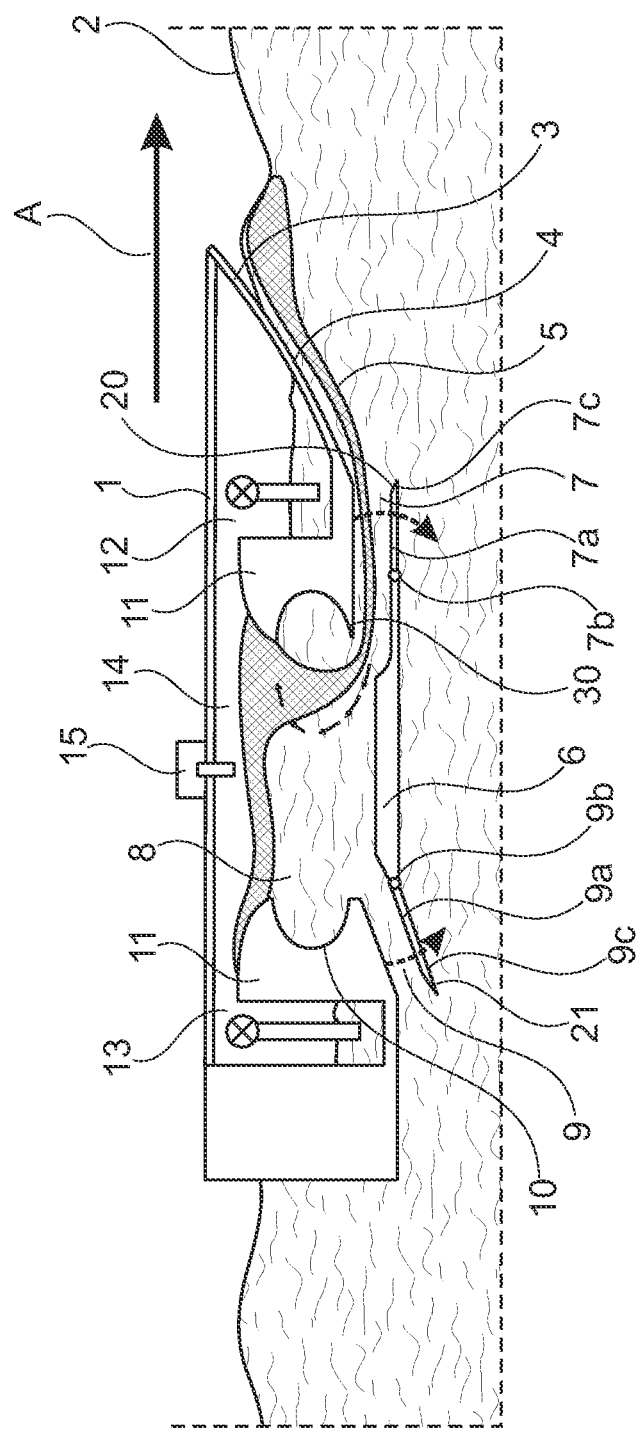

| | | | |
|---|---|---|---|
| 3,823,828 A * | 7/1974 | Derzhavets et al. | 210/242.3 |
| 3,966,615 A | 6/1976 | Petchul et al. | |
| 4,033,876 A * | 7/1977 | Cocjin et al. | 210/242.3 |
| 4,061,569 A | 12/1977 | Bennett et al. | |
| 4,120,793 A * | 10/1978 | Strain | 210/242.1 |
| 4,372,854 A * | 2/1983 | Szereday | 210/242.3 |
| 4,851,133 A * | 7/1989 | Rymal | 210/242.3 |
| 4,865,725 A * | 9/1989 | Metais | 210/242.3 |
| 5,022,987 A | 6/1991 | Wells | |
| 5,047,156 A * | 9/1991 | Sullivan | 210/242.3 |
| 5,194,151 A * | 3/1993 | Broussard | 210/242.3 |
| 2008/0219771 A1* | 9/2008 | Jarvinen | 210/776 |

FOREIGN PATENT DOCUMENTS

| | | |
|---|---|---|
| DE | 202004019997 | 2/2005 |
| FR | 2431420 | 2/1980 |
| GB | 1510670 | 5/1978 |

OTHER PUBLICATIONS

Written Opinion for PCT/DE2010/000420; Int'l File Date: Apr. 14, 2010; Earliest Priority: Apr. 14, 2009; 7 pages.

International Preliminary Report on Patentability issued Oct. 18, 2011 for PCT/DE2010/000420; Int'l File Date: Apr. 14, 2010; Earliest Priority: Apr. 14, 2009; 8 pages.

* cited by examiner

APPARATUS FOR PICKING UP PARTICLES FROM THE SURFACE OF A WATER SYSTEM

FIELD OF TECHNOLOGY

The invention relates to an apparatus for picking up particles from the surface of a water system, in particular particles of dirt.

BACKGROUND

There is often a need to clean dirt from water surfaces of lakes or seas. For example, marine accidents can result in devastating consequences for maritime fauna and flora and can furthermore entail an economic disaster for the fishing and tourist industries in the contaminated areas. The result of a marine accident can in particular be contamination with leaking oil.

The causes of oil contamination of the surfaces of water systems are however not restricted to marine accidents. Oil contamination can also occur as a result of industry in coastal areas, leaking pipelines at the oil transport site itself, natural oil contamination on the sea floor and deliberate oil contamination by ship crews. To remove the oil slicks produced in different ways in the region of the water surface, oil spill response systems, in particular oil spill response vessels, are used. The problem often arises in connection with the process of skimming off the spilled oil that the oil spill response measures must be interrupted owing to the swell. Such interruptions have disadvantageous consequences for the whole oil spill response; the spilled oil can in particular spread over a wider area of the surface of the water system as a thin layer of oil. Furthermore, during swell, the oil slick breaks up into small oil patches which are difficult to locate during the spill response. Furthermore, the oil emulsifies, i.e. it bonds with water and air and as a result becomes more viscous, which makes it much more difficult to remove the oil from the surface of the water system and subsequently separate it on board the oil spill response vessels.

DE 21 21 646 A1 discloses a water craft for responding to oil layers. An opening is provided in the water craft in the region of a bow section, through which opening water contaminated with dirt particles, in particular oil particles, passes into a hold while the water craft navigates over the surface of a water system from which water the dirt particles can be extracted with the aid of a suction device. After passing through the opening in the bow section, the water loaded with dirt particles flows past an edge into the hold.

DE 102 21 069 B4 discloses an apparatus for picking up particles from the surface of a water system in which hydrodynamic separation is used. When skimming off an oil film on a water system, the film flows along a bow underside of the oil pick-up apparatus as far as a separation blade which separates the oil film from the main flow and conducts it into a particle separation chamber, which is also referred to as a moon pool. An eddy is produced at a stall edge of the separation blade, which eddy accelerates the oil to be picked up to the free water surface in the particle separation chamber. The particle-containing water which passes into the particle separation chamber in this manner is prepared further in that the oil particles pass via a ramp out of the particle separation chamber into a particle collection chamber. The particle collection chamber is used for concentrating the separated particles. The particles are pumped from there into storage tanks.

In the known apparatus for picking up particles from the surface of a water system, the separation blade forms a rigid element in the region of the walls of the hull, which is extended for forming the inflow and outflow openings. This process requires considerable application of mechanical force, which makes it necessary to provide corresponding mechanical systems for moving the separation blade. As the known separation blade is not connected structurally to the hull, this reduces the strength of the ship body.

SUMMARY

A first aspect relates to an improved apparatus for picking up particles from the surface of a water system with which the process of picking up particles can be optimised.

A second aspect relates to an apparatus for picking up particles from the surface of a water system, in particular dirt particles, according to the independent claim 1. Advantageous configurations of the invention are subject matter of dependent claims.

The invention comprises the concept of an apparatus for picking up particles from the surface of a water system, in particular particles of dirt, with a float, in which a particle separation chamber is formed, into which particle-containing water can flow via an inflow opening, and out of which water at least partially freed from the particles can flow via an outflow opening, wherein the inflow opening is provided with an inflow flap means and the outflow opening is provided with an outflow flap means for opening and closing in each case.

The flap means, which each have a flap and an actuation mechanism, in the region of the inflow opening and the outflow opening makes it possible for the openings through which the particle-containing water flows into the particle separation chamber on one side and the water at least partially freed from the particles flows out of the particle separation chamber on the other side to be designed flexibly. The removal of the particles from the inflowing water preferably takes place according to the principle of hydrodynamic separation. It is no longer necessary to adjust an entire separation blade mechanically, as in the prior art. Rather, this is possible in a simplified manner with the aid of the flap means, which can optionally also be comprised by a flap system which integrates the flap means together. The inflow and outflow openings can be integrated in an optimised manner in the hull of the ship body with the aid of the flap means, wherein different hull shape designs of floats can in particular be taken into account.

The inflow and outflow flap means can each be moved between a closed and an open position by moving a respectively associated flap. In one configuration of one or both flap means, associated sealing means are provided which ensure sufficient tightness of the openings when in the closed state in order virtually or completely to prevent the ingress of water into the float when in this state. The sealing means can in this case be formed either only on the associated hull sections or both on the respective flap means and on the associated hull sections of the float.

A preferred embodiment of the invention provides for the inflow flap means and/or the outflow flap means to be formed with a pivotable flap. The pivotable configuration of one or both flaps is particularly preferred with respect to the mechanical demands of moving flaps.

In a preferred embodiment of the invention, it can be provided for the inflow flap means and/or the outflow flap means to be formed with a flap which opens outwards. If the outflow flap means opens outwards, a flow guide profile or element is mounted downstream of the inflow opening, which helps to transport the particles to the surface of the water in the separation chamber. The separation of particle flow and water can be achieved with the aid of the flow guide element, using eddy formation in the particle-containing water or without such eddy formation. In one configuration, eddies are induced in the particle-containing water with the flow profile or element, for which reason the flow guide element of this configuration can be formed with an eddy or stall edge. The particle separation chamber can be designed in such a manner that induced eddies are stabilised by means of specific flow shaping.

An advantageous embodiment of the invention provides for the inflow flap means and/or the outflow flap means to be formed with a flap which opens inwards. In this configuration too, the particle separation chamber can be designed by means of specific flow shaping in such a manner that induced eddies are stabilised.

A development of the invention preferably provides for the inwardly opening flap of the inflow flap means to be arranged in one or more opened states to form a flow guide element for the particle-containing water flowing in through the inflow opening. In this configuration, the inflow opening flap assumes the function of a flow guide profile or element in order to deflect the inflowing flow of the particle-containing water in a desired manner. The flow guide element can be formed with or without an eddy or stall edge.

One configuration of the invention can provide for the inflow flap means and/or the outflow flap means to be formed with a sliding flap. In this embodiment too, it can be provided for a flow guide profile or element to be mounted downstream of the inflow opening, which helps to transport the particles to the surface of the water in the separation chamber.

In an advantageous embodiment of the invention it can be provided for the flap of the inflow flap means and/or the flap of the outflow flap means to be mounted on a hull of the float. In an expedient embodiment, the mounting takes place in such a manner that the respective flap is mounted in a pivotable manner.

A development of the invention can provide for a baseplate to be formed on the float between the inflow opening and the outflow opening. The inflow opening is usually arranged on the bow side of the baseplate, whereas the outflow opening is situated on the stern side of the baseplate. The baseplate is formed in one configuration as an immovable structural part of the hull of the float.

A preferred embodiment of the invention provides for the inflow flap means and/or the outflow flap means to be formed at least partially on the baseplate. One or both flaps are expediently mounted at the ends of the baseplate, namely on the bow side and/or the stem side.

In a preferred embodiment of the invention it can be provided for a distal end of the flap of the inflow flap means and/or a distal end of the flap of the outflow flap means to bear the respectively associated opening in a sealing manner on the baseplate, at least in the closed state of the flap. In this embodiment it can be provided for sections of the baseplate which are associated with each other on one side and the flaps on the other side to come to bear in a formfitting manner during bearing. For example, the flaps have rounded or otherwise shaped sections which come to bear against matchingly shaped sections of the baseplate. In one configuration, depressions and associated projections can also be provided on the flaps and the baseplate. The bearing between the associated elements can for example be mechanically stabilised thereby.

An advantageous embodiment of the invention provides for the baseplate to have a side section which is inclined or rounded compared to the central baseplate section on the outside on a side facing the inflow opening and/or on a side facing the outflow opening. What is known as a flow hump can be formed in this manner in order to optimise the flow behaviour of the water on the outside of the hull of the float.

A development of the invention preferably provides for the flap of the inflow flap means and/or the flap of the outflow flap means to be formed at least in sections with a flow-optimised surface shape on the outside. It can thereby in particular be achieved in a possible embodiment that the flow-optimised surface shape acts to deflect the flow with inwardly opening flap means.

In an advantageous embodiment of the invention, it can be provided for the inflow flap means and/or the outflow flap means to be adjustable independently of each other with respect to a respective flap position.

DETAILED DESCRIPTION

Figure 2:
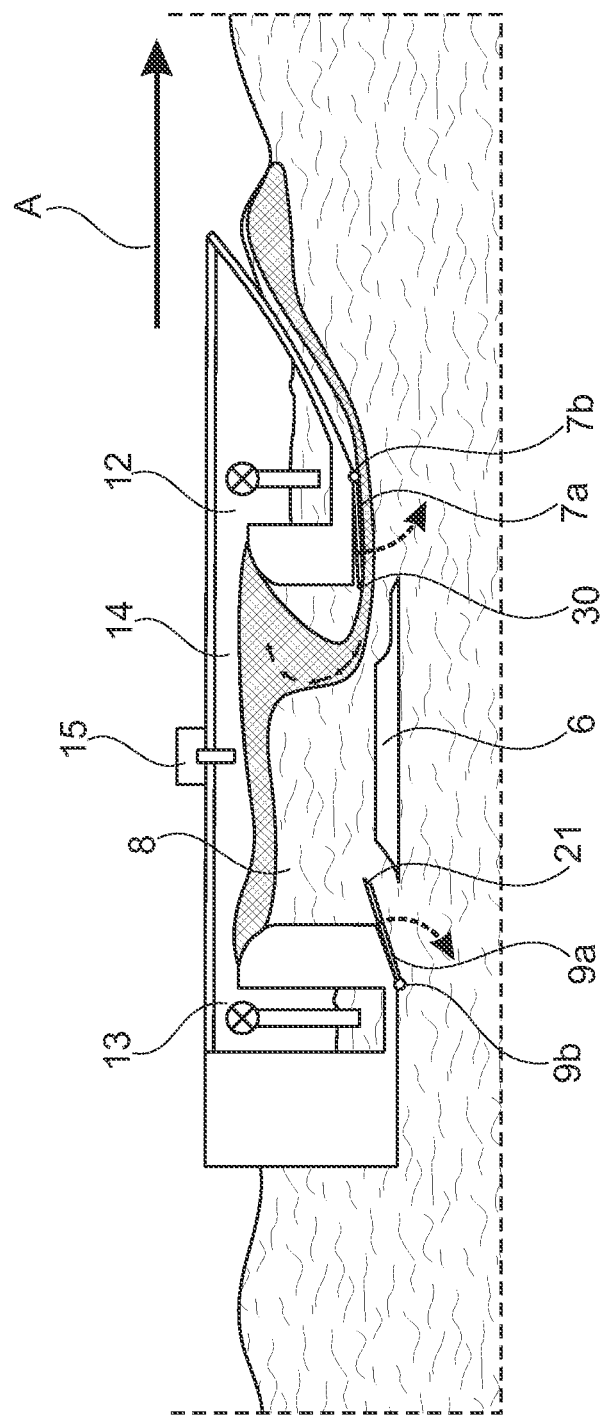
Figure 3:
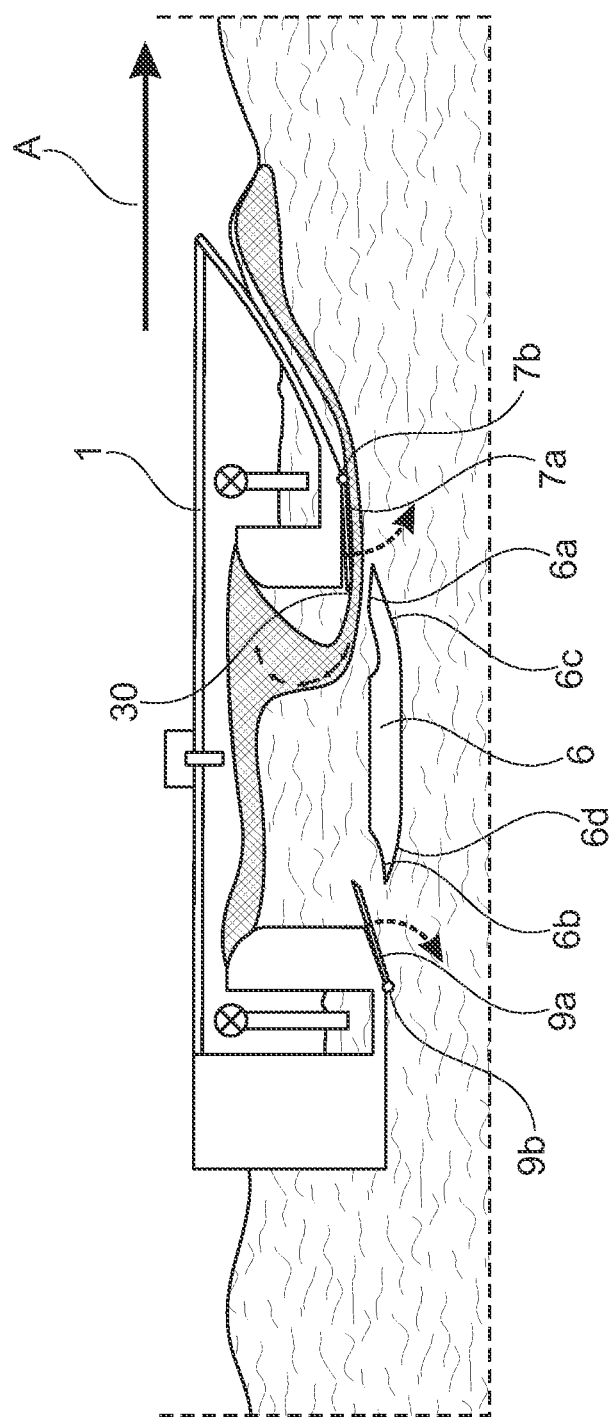
Figure 4:
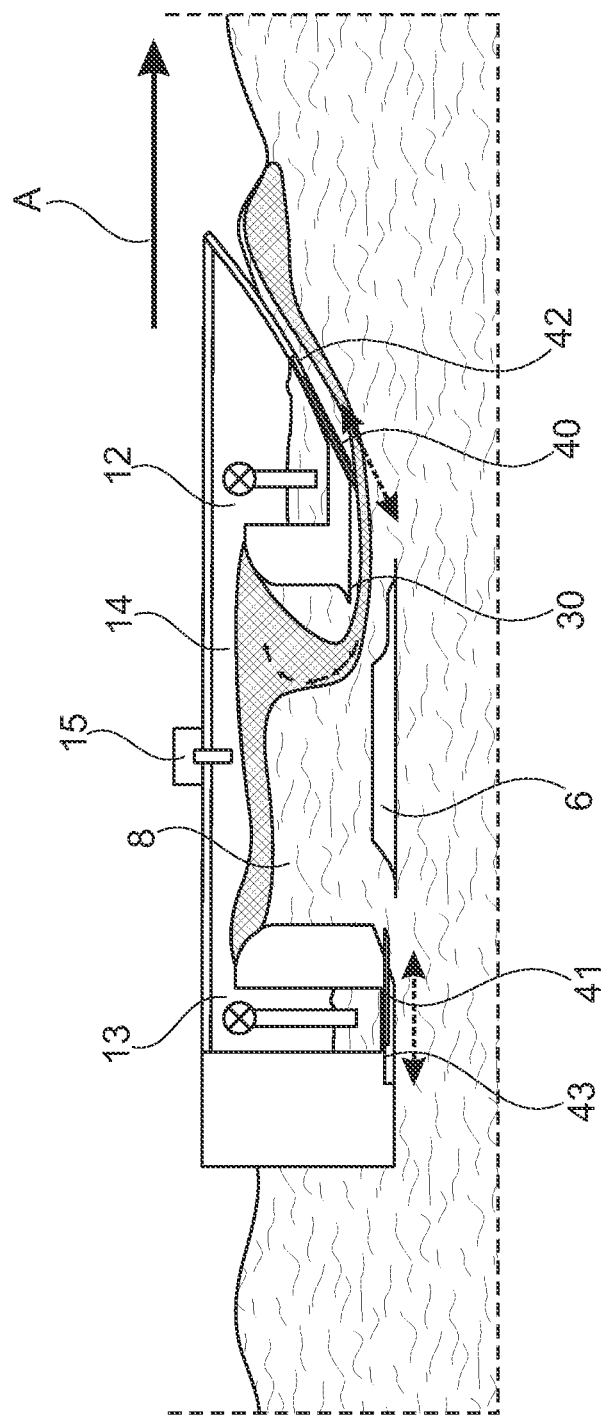

The invention is described in more detail below using exemplary embodiments with reference to figures of a drawing. In the figures:

FIG. 1 shows a schematic diagram of an apparatus for picking up particles from the surface of a water system, in which outwardly opening flaps are formed on a hull underside, FIG. 2 shows a schematic diagram of an apparatus for picking up particles from the surface of a water system, in which inwardly opening flaps are formed on a hull underside, FIG. 3 shows a schematic diagram of an apparatus for picking up particles from the surface of a water system, in which inwardly opening flaps cooperate with a flow-optimised baseplate on a hull underside, and FIG. 4 shows a schematic diagram of an apparatus for picking up particles from the surface of a water system, in which sliding flaps are formed on a hull underside.

FIG. 1 shows an apparatus for picking up particles from the surface of a water system. A hull body 1 is moved along the direction of travel shown schematically by an arrow A over a surface 2 of a water system in order to clean the surface 2 of the water system. When the hull body 1 moves over the surface 2 of the water system, waves are calmed by a bow section 3 of the hull body 1. Dirt particles floating on the surface 2 of the water system are forced by the movement of the hull body 1 over the surface 2 of the water system into a flow which flows along a lower surface 4 of the hull body 1. The flow with the dirt particles flows below the hull body 1 into an inflow region 5 in which an inflow or inlet opening 7 is formed adjacently to a baseplate 6, through which inflow opening particle-containing water then passes into a particle separation chamber 8.

A flow guide element or profile 30 is arranged downstream of the inflow or inlet opening 7, which helps to distribute or guide the dirt particles upwards in the particle separation chamber 8, that is, in the region of the water surface. The guiding or distribution function can be implemented with the help of eddies in the particle-containing water flow or essentially without such eddies. If eddies are used, the flow guide element or profile 30 can have an eddy or stall edge which is used to form and/or support eddies, so eddies are induced in the particle-containing water flow and/or existing eddies are supported or promoted in a targeted manner. Eddies can also form via the outlet or outflow opening 9 of the particle separation chamber 8. Specific, flow-optimised shape elements 10 are used in the embodiment shown to stabilise the eddy in the particle separation chamber 8. A pulsing behaviour of the eddies can for example be minimised or even completely prevented thereby.

In the region of the inflow opening 7 and the outflow opening 9, a respective flap 7a and 9a is arranged, which can be referred to as inflow flap and outflow flap and can be pivoted about an associated pivot axis 7b, 9b to open and close the respective opening. In the configuration in FIG. 1, the flaps 7a, 9a open outwards and are mounted pivotably on the baseplate 6.

The particles to be separated are removed from the particle separation chamber 8 via slope or ramp elements 11 belonging to a separation means for separating the particles into adjacently arranged particle collection chambers 12, 13, in which the particles are concentrated. The separation method used corresponds to the principle of hydrodynamic separation.

During the operation shown in FIG. 1 of the apparatus for picking up particles from the surface 2 of a water system, a closed chamber 14 is formed including the particle separation chamber 8 and the particle collection chambers 12, 13, which closed chamber is in the embodiment shown sealed off hermetically from the environment, in particular by means of an airtight configuration. With the aid of a pressure regulation means 15, an inner pressure is set in the closed chamber 14 in order to set a filling level of the particle-containing water in the particle separation chamber 8 in this manner, as a result of which the filling level is set relative to the slope or ramp elements 11, which in turn influences the separation of the dirt particles from the particle separation chamber 8 into the particle collection chambers 12, 13. With the aid of the inner pressure regulation, reactions to swell- and/or draught-relevant changes can be carried out for the apparatus in order to ensure optimal separation of the particles depending on the situation. To this end, an automatic water level control apparatus and/or optical monitoring of the closed chamber 14 can be provided. The inner pressure can be increased and the water level reduced or the inner pressure can be reduced and the water level raised by means of compressors.

The inflow flap 7a and the outflow flap 9a are each shown in FIG. 1 in an open pivot position which is set by pivoting the inflow and outflow flaps 7a, 9a about the respective pivot axis 7b, 9b on the baseplate 6. The inflow and outflow flaps 7a, 9a have at the distal ends 7c, 9c thereof canted portions 20, 21 which are flow-active and support optimised bearing of the respective flap on the hull body 1 when the flap is in the closed state.

FIGS. 2 and 3 show schematic diagrams of apparatus for picking up particles from the surface of a water system, in which the inflow and outflow flaps 7a, 9a open inwards. The same reference symbols as in FIG. 1 are used for the same features in FIGS. 2 and 3.

The inflow and outflow flaps 7a, 9a are shown in FIGS. 2 and 3 in an open position, which is achieved by pivoting the respective flap about the associated pivot axis 7b, 9b, which in this embodiment is formed on the hull. In contrast to the embodiment according to FIG. 1, the flow guide element or profile 30 in the configurations of FIGS. 2 and 3 is formed at the distal end 20 of the inflow flap 7a.

In the closed position (not shown), the inwardly opening flaps 7a, 9a bear on associated bearing sections 6a, 6b on the baseplate 6. In this case, surface-shape-adapted sections of the flaps 7a, 9a on one side and of the baseplate 6 on the other side come to bear.

In the embodiment of FIG. 3, the baseplate 6 has canted sections 6c, 6d on the bow and stern sides, as a result of which a type of flow hump is formed.

FIG. 4 shows a schematic representation of an apparatus for picking up particles from the surface of a water system, in which sliding flaps 40, 41 are formed on the hull underside and are moved in and out of the hull body 1 in associated flap holders 42, 43 on the hull body 1 in order to set the inflow opening 7 and the outflow opening 9.

The features of the invention disclosed in the above description, the claims, and the drawing can be of significance individually as well as in any combination for the implementation of the invention in its different embodiments.

The invention claimed is:

1. An apparatus for picking up particles from a surface of a water system, comprising:
    a float, in which a particle separation chamber is formed, into which particle-containing water can flow via an inflow opening, and out of which water at least partially freed from the particles can flow via an outflow opening, the particles being removed from the inflowing water according to hydrodynamic separation wherein the inflow opening is provided with an inflow flap means and the outflow opening is provided with an outflow flap means for opening and closing of the outflow opening;
    wherein the inflow flap means includes a pivotable inflow flap that opens inwardly, arranged in one or more opened states to form a flow guide element for the particle-containing water flowing through the inflow opening, the flow guide element distributing the particles upwards in the particle separation chamber;
    wherein the inflow opening is located on a lower surface of a hull body of the float so that the inflow opening is entirely below the surface of the water system to receive the particle-containing water;
    wherein the particles floating on the surface of the water system are forced by a movement of the hull body along the surface into a flow which flows along the lower surface of the hull body.

2. The apparatus according to claim 1, wherein the outflow flap means is formed with a pivotable outflow flap.

3. The apparatus according to claim 2, wherein the pivotable outflow flap opens outwards.

4. The apparatus according to claim 2, wherein the pivotable outflow flap opens inwards.

5. The apparatus according to claim 1, wherein the outflow flap means are formed with a sliding flap.

6. The apparatus according to claim 1, wherein the pivotable inflow flap of the inflow flap means and/or the outflow flap of the outflow flap means are mounted on the hull of the float.

7. The apparatus according to claim 1, wherein a baseplate is formed on the float between the inflow opening and the outflow opening.

8. The apparatus according to claim 7, wherein the inflow flap means and/or the outflow flap means are at least partially formed on the baseplate.

9. The apparatus according to claim 7, wherein a distal end of the pivotable inflow flap of the inflow flap means and/or a distal end of the outflow flap of the outflow flap means bear the respectively associated opening in a sealing manner on the baseplate, at least in a closed state of the flap.

10. The apparatus according to claim 7, wherein the baseplate has a side section which is inclined compared to the central baseplate section on the outside on a side facing the inflow opening and/or on a side facing the outflow opening.

11. The apparatus according to claim 1, wherein the pivotable inflow flap of the inflow flap means and/or the outflow flap of the outflow flap means are formed at least in sections with a flow-optimised surface shape that acts to deflect the flow.

12. The apparatus according to claim 1, wherein the inflow flap means and/or the outflow flap means are adjustable independently of each other with respect to a respective flap position.

13. The apparatus according to claim 1, wherein the particles are particles of dirt.

* * * * *